United States Patent [19]

Karow

[11] Patent Number: 4,667,247

[45] Date of Patent: May 19, 1987

[54] METHOD AND APPARATUS FOR CHECKING THE QUALITY OF COMPOSINGS FOR PRINTING PRODUCTS, IN PARTICULAR NEWSPAPERS

[75] Inventor: Peter Karow, Hamburg, Fed. Rep. of Germany

[73] Assignee: Dr. Ing. Rudolf Hell GmbH, Keil, Fed. Rep. of Germany

[21] Appl. No.: 634,961

[22] Filed: Jul. 27, 1984

[30] Foreign Application Priority Data

Jul. 29, 1983 [EP] European Pat. Off. ........ 83107480.2

[51] Int. Cl.[4] ........................................ H04N 1/40

[52] U.S. Cl. ........................................ 358/280; 358/282; 382/56

[58] Field of Search ........................ 382/56, 51, 27; 358/280, 282; 340/751, 793

[56] References Cited

U.S. PATENT DOCUMENTS 4,303,948 12/1981 Arai et al. ........................ 358/287

FOREIGN PATENT DOCUMENTS 0054693 6/1982 European Pat. Off. .

2005500 4/1979 United Kingdom .

OTHER PUBLICATIONS

Soft Typography, by Christopher Schmandt, "Information Processing" 80, S. H. Lavington (ed.), pp. 1027–1031.

Abbreviated Character Font Display by C. R. Bringol, IBM Technical Disclosure Bulletin, vol. 19, No. 9, Feb. 1977, pp. 3248 and 3249.

All-Points-Addressable Raster Scan Graphics for Cathode Ray Tube with Dual-Ported Bit Map by D. A. Kummer et al, IBM Technical Disclosure Bulletin, vol. 23, No. 8, Jan., 1981, pp. 3553–3555.

A Soft-Edged Character Set and Its Derivation, by A. J. Wilkes et al, The Computer Journal, vol. 25, No. 1, 1982, pp. 140–145.

*Primary Examiner*—James J. Groody
*Assistant Examiner*—Edward L. Coles

[57] ABSTRACT

Record quality of a bit map of a newspaper page, for example, is checked directly on a display screen without previously manufacturing a material image carrier, such as a film. For this purpose, it is read out in multi-line fashion, preferably in 4 - line fashion. Squares consisting of m (preferably likewise 4) successive points of n (preferably 4) superimposed lines are grouped into one "superpixel" each, and its gray value, for example, is determined as an average of the black-white values of the individual pixels forming the square. The superpixel is displayed with its gray value as a single point on the display screen instead of the m×n square.

9 Claims, 8 Drawing Figures

METHOD AND APPARATUS FOR CHECKING THE QUALITY OF COMPOSINGS FOR PRINTING PRODUCTS, IN PARTICULAR NEWSPAPERS

BACKGROUND OF THE INVENTION

The invention relates to a method and apparatus for checking the record quality of printing products, in particular newspapers.

For the production of newspapers and/or journals, customarily text commands are input on an electronic typesetting machine in such a fashion that, in sequence, the addresses for the various successive characters, such as letters, numbers, punctuation marks, etc. are fed in. The typesetting machine, with the aid of the addresses, then calls for its character memory or font memory for each character the corresponding digital information for recording the character, combines the latter in the commanded sequence and, in this fashion, compiles the so-called bit-map (bit-arrangement map) in which the text image is coded in a line-by-line and point-by-point fashion. The individual bit maps of each of the characters stored in the font memory are customarily represented with 34×34 bits per 9 p em quad.

In such a bit-map, customarily parts of a newspaper page, in the form of approximately 1000 image point-wide strips, are intermediately stored transversely over the entire page up to a length of approximately 12,000 bits. A newspaper page of approximately 40×60 cm is produced through a line-by-line and point-by-point reading-off of the bit map and a line-by-line and point-by-point exposure of a film with e.g. laser light, whereby the value 0 of a bit is interpreted e.g. as "light off" and the value 1 is interpreted as "light on".

Instead of a laser exposure, also laser evaporating apparatus for the direct production of the printing plate, laser copiers for the direct recording of normal paper, or cathode ray tubes can be employed. However, before the printing can take place, the bit map of the newspaper page must be checked both for type setting errors as well as for its typography. In particular, it must be checked for a correct and final arrangement of the lines, the line justification, the articles, and pictures. This so-called "makeup check" (in memory at the time of type printing) up to the present time is possible only by way of the described indirect route via the manufacture of a film or another material image carrier (e.g. a copy on normal paper). This indirect route is burdensome and undesirable on account of the material expense caused thereby. The time loss connected therewith frequently is of even graver consequence in view of the time pressure under which the record check must be completed prior to copy deadline.

Indeed, theoretically it would be conceivable to avoid this expense and time loss if the information from the bit map is directly transmitted to a display screen of a sufficiently great resolution capability. However, this fails due to the fact that display screens with the resolution capability absolutely necessary for this purpose are not available up to the present time. Whereas the normal television display screens can represent 512×512=262,124 or approximately $0.26\times10^6$ picture points, the maximum resolution capability which special models of television display screens available today have corresponds to approximately 1000×1000 image points without field separation.

A newspaper page customarily has a size of 40×60 cm. The text is most frequently recorded with a letter size of 3.4×3.4 mm for the em quad, which corresponds to approximately 2.2 mm for the height of the letter "H". If the upper (or lower) 40×40 cm of the newspaper page were represented with 1000×1000 image points, then, on the em quad in the center, instead of the 34×34 bits, available in the original bit map of the newspaper page, only approximately 8.5×8.5 bits would be eliminated; i.e. 8.5×8.5 black or white picture points. Thus, even with the use of special display screens with the maximum resolution capability obtainable today, the text would still remain illegible.

SUMMARY OF THE INVENTION

An object of the invention is to provide a method and an apparatus for checking the record quality of printing products, in particular, newspapers, whereby an improved legibility is obtained.

The invention accomplishes this in that the information content of a bit map is read in a multi-line fashion by a reading apparatus and fed into an intermediate apparatus in which, from successive squares or matrices of m successive pixels in each of n adjacent lines, the average gray value of the squares m×n is determined and, together with the position of the respective square, is fed into a display screen input apparatus.

In an advantageous fashion, the successive squares consist of four successive pixels in each of four successive lines, whereby the picture points reproduced on the display screen have smaller dimensions than corresponds to the sum of the dimensions of the individual pixels from which they are constructed.

Preferably, the picture points reproduced on the display screen, in relation to the individual pixels of the bit map, are reduced approximately in the ration of 1:4 to close to 1:1.

An advantageous further development of the invention is that the bit map to be checked of the printing product is constructed of a font whose character matrices of the various characters are of mutually equal height but of different widths depending upon the individual property of the respective character.

An apparatus for carrying out the method comprises a permanent font-memory, a compositon or record computer, a memory for the bit map prepared by the composition or record computer, possibly an intermediate memory for the character data taken from the font memory, a video controller connected before the display screen, a partial byte computer connected after the bit-map memory, and a partial byte memory connected after the bit-map memory connected before the video controller.

An advantageous further development of the apparatus is that the partial byte computer is a half-byte computer and the partial byte memory is a half-byte memory. The input of the video controller has at least a band width of $64\times10^6$ half bytes/sec. There is also connected, between the partial byte memory and the monitor in the video controller, a selector for selecting individual partial bytes from a packet of several partial bytes. The selector can be a 1 of 8 selector.

Preferably, between the interface a—computer/memory and the interface b—memory/video controller, a RAM two-way-memory with a multiple block interlacing or nesting is arranged which can contain four interlaced or nested blocks.

The invention permits a legible image reproduction of the bit map of the upper or lower portion of e.g.

40×40 cm of a newspaper page; i.e. ⅔ of the normal page. It is based on the surprising discovery that this can be made possible since the input apparatus of the display screen, instead of being fed bit-by-bit with the unedited information content of the bit map, is fed with information corresponding to the unedited information but edited in a particular manner. In accordance with the invention, the information of several adjacent image points, preferably of a square of 4×4 points, is combined as a gray tone and inciphered. In the just-cited preferred example, such a "super pixel" contains, as the gray tone, the sum of the black bits of a 4×4 - point surface, corresponding to a representable gray scale of $16=2^4$ values which can be enciphered as a half byte (= 4 bits). Through this inventive technique, the number of image points to be represented on the display screen is considerably reduced (in the cited example by a factor of 16), whereas the transmitted information quantity is reduced by substantially less (in the cited example, by a factor of 4). As practical experiments have shown, in spite of the considerable reduction of the transmitted image points, the legibility is not decisively impaired.

Thus, according to the inventive method, it is possible to record or write e.g. the 40×40 cm of a newspaper page with 4000×4000 bits in a bit map and to transmit the latter with only 1000×1000 various gray values via a special circuit to the input apparatus of the television display screen.

For the letter size 3.4×3.4 mm=8.5×8.5 gray pixels available, and the character fonts employed in newspapers can be reproduced in their typographic diversity with a completely satisfactory legibility.

According to a preferred embodiment of the invention, for the digital image information of the various letters stored in the font memory of the typesetting machine, bit matrices of mutually equal height, but different width, are employed, depending upon how the width of the respective character demands it, e.g. for the letters "w" and "m", 34 bits including leading width and trailing width and only e.g. 5 f or a ".".

Possibly, the "super pixels" can be reproduced in a smaller size on the display screen than corresponds to the sum of the individual pixels from which they are constructed. In the cited preferred example in which each "super pixel" is composed of 4×4 individual pixels with the dimensions of 0.1×0.1 mm each, it is preferably reproduced, instead of in a size of 0.4×0.4 mm, depending upon the dimensions of the employed television screen, in a size of 0.2×0.2 mm to 0.36×0.36 mm. Thus, according to this example, a newspaper section of 40×40 cm can be reproduced with super pixels of 0.2×0.2 to 0.36×0.36 mm lateral length each; i.e., on a display screen of 20×20 to 36×36 cm, with an image capacity of 1000×1000 image points.

For carrying out the inventive method of checking the record or composition quality of printing products, accordingly an intermediate apparatus between the reading apparatus, connected after the bit map, and the input apparatus, connected before the bit map, is necessary, which reads out the bit map in an n line-by-line fashion (preferably a 4-line-by-line fashion), combines it in m pixel width (preferably 4-pixel width) to a series of successive squares, calculates from the m×n (preferably 4×4) individual pixels, the average gray value, and feeds this information, in the form of a multi-bit-code (preferably in the form of a half byte) into the display screen input.

DESCRIPTION OF THE PREFERRED EMBODIMENTS

Figure 1A:
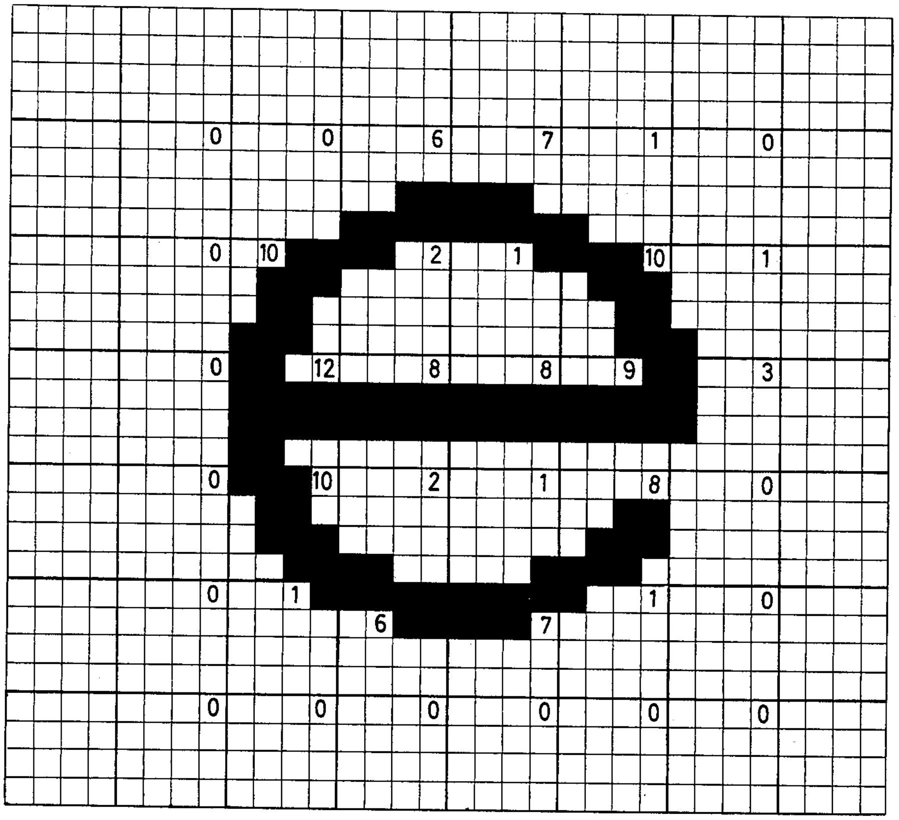
FIGS. 1*a* through 1*c* show a comparative representation of a character with and without gray value representation.
Figure 1B:
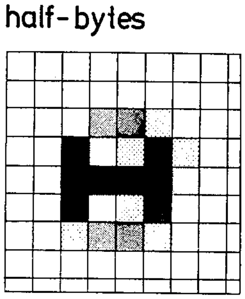
Figure 1C:
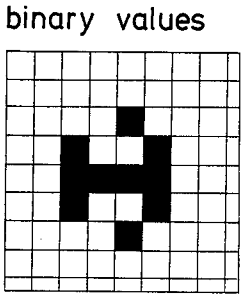

A method of operation of the invention is illustrated, for example, for the letters "e" on the basis of FIGS. 1*a* through 1C. FIG. 1*a* shows the bit map for this letter with the bit number of 34×34 bits per 9p-letter em quad particularly common in newspaper printing—with the "super pixels" combined in squares (in the illustrated example —4×4 pixels). For each of these squares, the number of the black bits contained in it is disclosed. FIG. 1*c* shows how this letter would look in the case of a pure black-white reproduction (the squares with at least seven black bits per square are black and the squares with six or fewer black bits per square are white) with 8.5×8.5 pixels per letter em quad. The letter is entirely illegible.

From FIG. 1*b* it is apparent that the same letter becomes thoroughly legible in the case of reproduction with the same number of pixels per letter em quad if the reproduction, in accordance with the invention, proceeds with pixels of suitably graduated gray values. This particularly applies when the letter is viewed in reduced fashion to the correct size of approximately 3 mm, or, from a greater distance e.g. 4 m, which amounts to the same thing.

Figure 2:
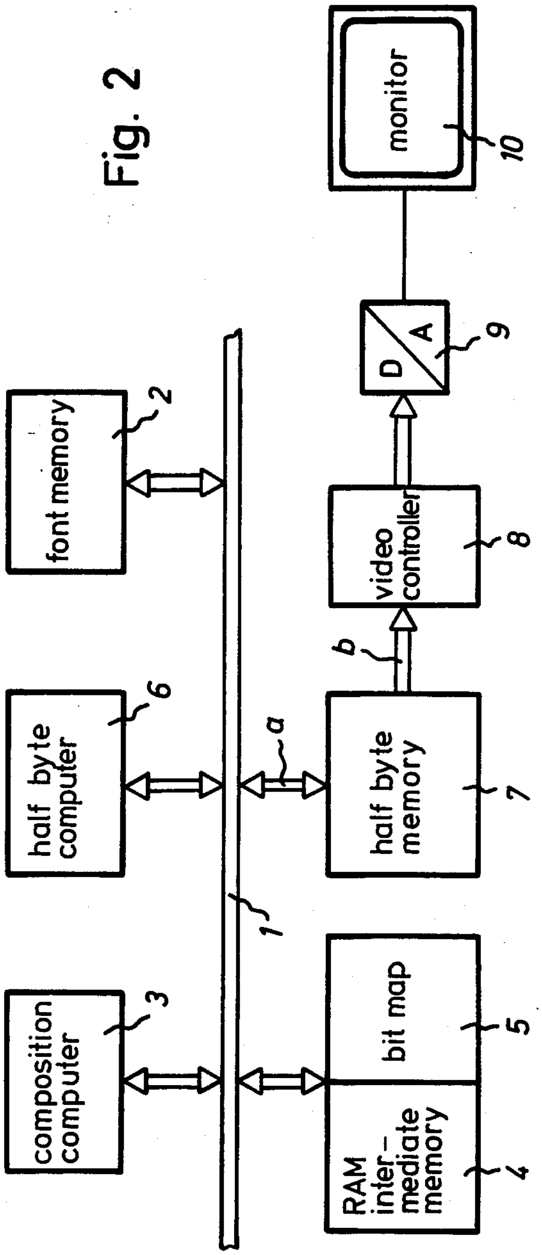
FIG. 2 shows an installation for carrying out the invention.

In FIG. 2 there is a BUS line 1 via which units 2 through 7 can communicate with one another e.g. a conventional VME-BUS. A font memory is provided in which the bit matrices for the individual characters are permanently stored, preferably on magnetic discs (floppy discs). The sum of all characters of a specific type forms a so-called font. Customarily, for a type which is to be represented in 9p-type size, per character a bit matrix of 34×34 bits is made available. See, for example, FIG. 1, in which also the number of black pixels per 4×4 bit-quad is shown. The text to be typeset is constructed of a composition or record computer e.g. a computer of the type MC 68000 of Motorola. It copies in the bit maps of the individual letters at the correct geometric location in the bit map memory. Preferably it does not call these individual bit maps directly each time from the font memory 2, but loads the entire font initially in an intermediate memory 4 which is advantageously a RAM memory (Random Access Memory). As memory modules for this intermediate memory e.g. FORCE-printed circuit motherboards can be employed. According to the illustrated preferred embodiment of the invention, the text commands to be processed by the composition or record computer 3 contain, in addition to the text, also information regarding thickness (compare with FIG. 1) of each letter; i.e., the precise distance in bits which it occupies together with a slight white area before (leading width) and a slight white area after (trailing width). In this manner, the composition computer 3 can determine the most advantageous initial position for the bit map of the respective character string letter from the information of the character just type-set.

The partial byte computer 6 of the invention likewise is connected to the BUS 1 and operates independently of the composition computer 3. The partial byte computer 6, in the case of the illustrated preferred embodiment, is a half-byte computer, for example a FORCE CPU 68000 Sys 68K/CPU-1.

It reads in, sequentially from left to right, lines of preferably 4 bits each in height, and forms, from $4\times4$ bits each, a half byte which is loaded at the corresponding position of the half byte memory 7 (a in FIG. 2). The computer 6 proceeds in a line-by-line fashion and forms, from the first $4\times4000$ bits of the bit map 5, the first $1\times1000$ half bytes of the memory 7, and likewise forms, from the second $4\times4000$ bits, the second $1\times1000$ half bytes, etc. Independently both of the composition computer as well as of the half byte computer the video controller, connected only to the half byte memory, but not to the BUS-line 1, calls from the half byte memory 7 in line-by-line fashion 1000 half bytes each. From the latter, via the digital-to-analog converter necessary for the display screen input, the television signals for a television line are generated and presented to the electronics of the monitor 10.

In order to guarantee a satisfactory continuous image representation on the monitor, in the illustrated example it is preferable to employ a video controller input with a bandwith of at least $64\times10_6$ half bytes/sec.

Figure 3:
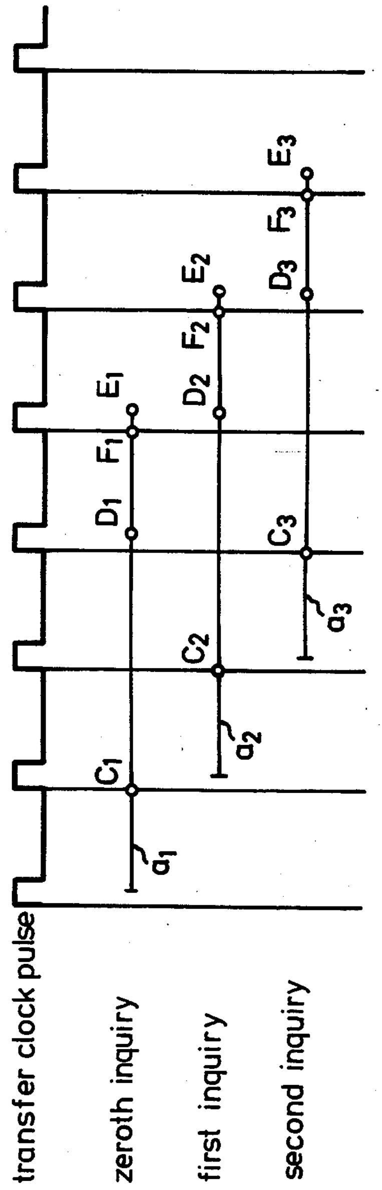
FIG. 3 shows a diagram for the transfer of the half bytes to the video controller.
Figure 4:
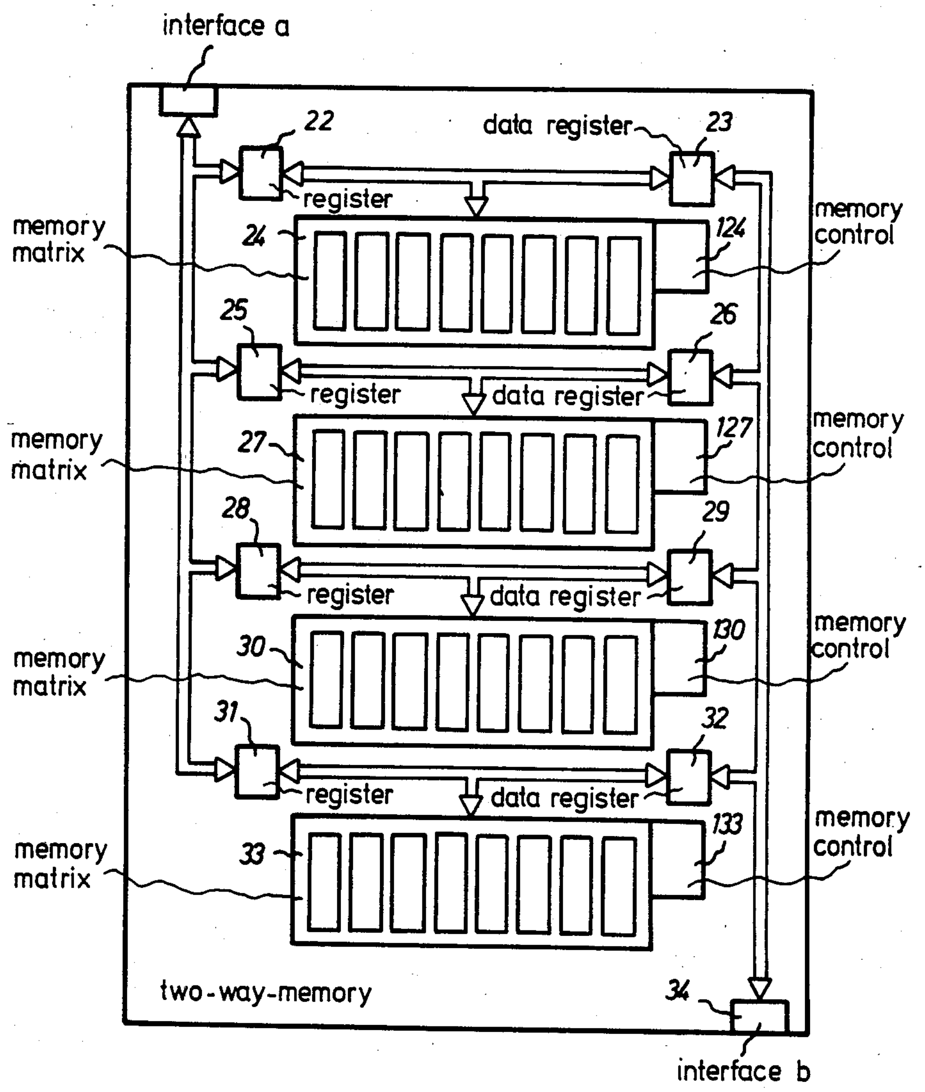
FIG. 4 shows an example of an interface between bus and half byte memory, and half byte memory and video controller.

The transfer of the half byte information from the half byte memory 7 to the monitor 10 is illustrated in greater detail in FIGS. 3 through 5.

The video controller demands, in succession, from the half byte memory 7, packets of 8 half bytes each 32 bits of specific addresses, for example, the 15th packet of the 27th line.

The chronological dispatch of these jobs is apparent from FIG. 3, in which the uppermost line represents the transfer clock pulse which can amount to, for example, 125 ns. In the second line, the successive job numbers are indicated. Of the lines $a_l$, $a_2$, $a_3$ . . . , the left initial point represents the commencement of an inquiry, and the right end point represents the termination of the transfer of the requested half byte packets from the memory 7 to the video controller 8. Each inquiry is only picked up when the memory finds a positive edge of the transfer clock pulse (point C, index 1, C index 2 . . . also compare with uppermost line).

After termination of the processing (points $D_1$, $D_2$, $D_3$) the requested half byte packet is transferred to the video controller (transfer points $F_1$, $F_2$, $F_3$ . . . ), (end points $E_1$, $E_2$, $E_3$ . . . ).

As it is apparent from FIG. 3, according to the illustrated preferred embodiment of the invention, several, partially overlapping jobs (4 in the illustrated example) are simultaneously accepted and executed so that a considerable acceleration of the transmission speed is obtained.

FIG. 4 shows a suitable circuit for this purpose. It relates to a 2-way memory into which and from which, transmission can be carried out asynchronously. The circuits makes it possible to access many times, and in the illustrated example, 4 times.

Via the interface a, the 2-way memory is connected with the BUS line 1; and via the interface b, it is connected with the video controller 8.

In the case of memory access by the video controller, an address transmitted by an address generator (later illustrated in FIG. 5*a*) by which a 32 bit-word is to be read, is transmitted via the transfer interface b (referenced in FIG. 4 with 34)) into one of the four address-/data registers 23, 26, 29, 32. The particular one it enters depends upon the address. In the case of continuous addresses, the registers 23, 26, 29, 32 are successively addressed.

Each of the 4 registers is connected with a memory matrix 24, 27, 30, 33 with the capacity of 64K 32-bit-words and a memory control 124, 127, 130, 133. The memory control, which ensures the correct timing in the case of the memory modules, is known per se and is constructed of standard TTL modules. The memory matrix is constructed from 64K bit-large dynamic RAM memories (e.g. Mostek MK 4564). After expiration of the access time of the memory matrix 24, 27, 30, 33, the data are ready at the output of the matrix and are loaded in the address/data registers 23, 26, 29, 32. Via the transfer interface 34 they reach a half byte collecting register of the video controller 8. The access of the half byte computer 6 proceeds analogously to the memory access of the video controller.

The connection to the BUS 1 via the interface a proceeds via the registers 22, 25, 28 and 31.

Figures 5A, 5B:
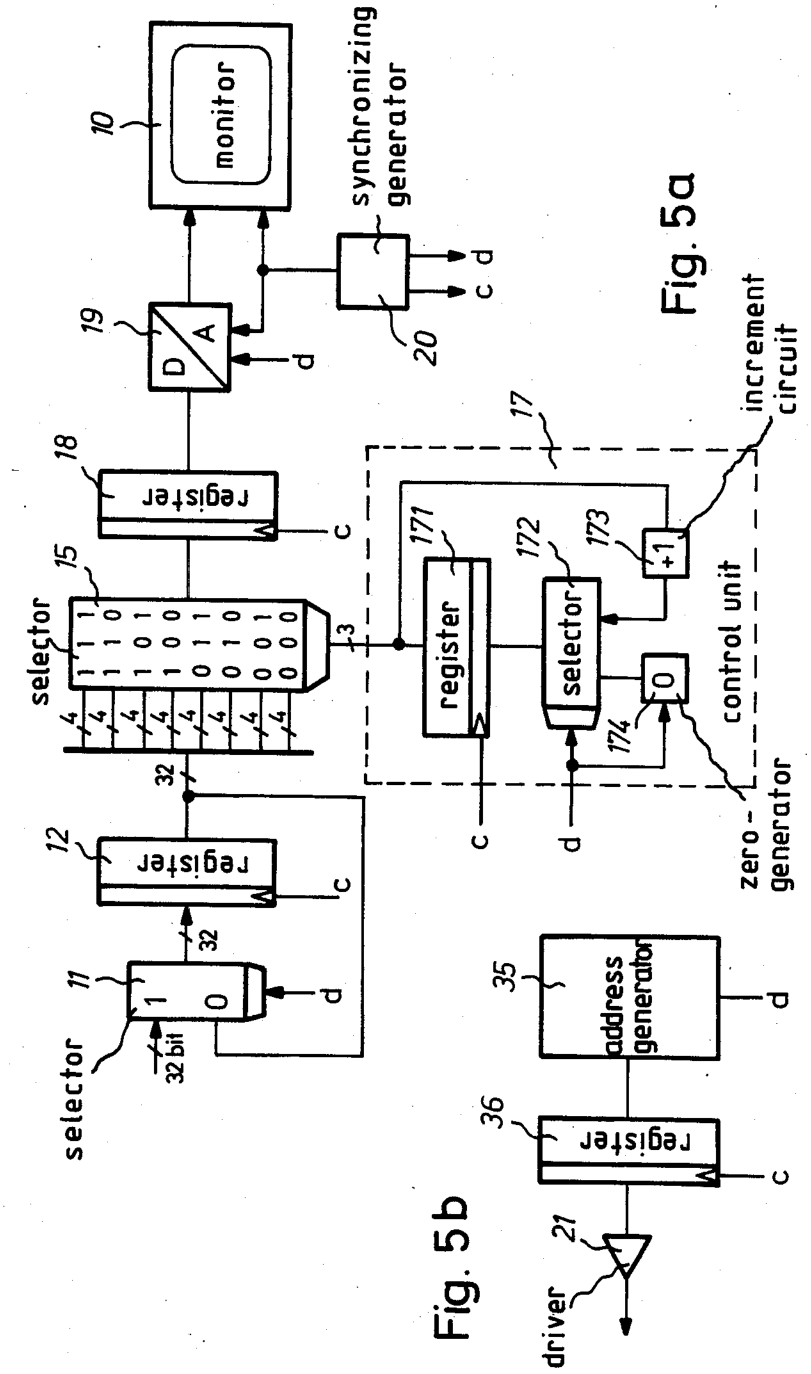
FIGS. 5*a* and 5*b* show a circuit example for the transfer from the half byte memory to the monitor.

In FIGS. 5*a* and 5*b*, the transfer from the half byte memory 7 to the monitor 10 is illustrated in greater detail. An address generator 35 is provided (e.g. AMD AM 2932) which is controlled via a basic clock pulse d. This clock pulse is supplied by the synchronization generator 20 and is identical to the basic clock pulse illustrated in FIG. 3, i.e. the transfer clock pulse. The address generator 35 transfers the current address of the half byte packet to be recalled to an address register 36 (e.g. TI SN 74 LS374), which accepts the address with the system clock pulse and makes it available at the output. Via a bus driver 21 the address reaches the half byte memory 7.

Via a selector 11 the data delivered by the half byte memory reaches the half byte collecting register 12 where they are taken over with the system clock pulse c.

At the output of the register 12 a half byte packet consisting of eight individual half bytes is available. Via a 1 of 8 selector 15, in succession the individual half bytes are selected and forwarded to a half byte representation register 18 in which they are taken over with the system clock pulse c. The 1 of 8 selector 15 has 8 inputs as well as a control unit 17. The control unit 17 is comprised of a register 171 which is activated by the system clock pulse c. The register 171 is connected to a selector 172 which is activated by the basic clock pulse d, which, just like the clock pulse c, is delivered by the synchronization generator 20. The clock pulse c is 8 times faster than the clock pulse d since, in a clock pulse period of d, the 1 of 8-selector 15 is interrogated 8 times. The selector 72, moreover, is connected to an increment circuit 173 and to a zero generator 174 which is likewise activated by the clock pulse d. During loading of a new half byte packet into the synchronous register 14, the control unit 17 is reset via the control signal d so that the first half byte reaches a half byte representation register via the 1 of 8 selector 15. The system clock pulse c increases the value of the control unit by 1, and the next half byte reaches the half byte representation register 18 via the 1 of 8 selector 15. After increasing the value of the control unit 17, 7 times, the last half byte of the half byte packet is connected through to the half byte representation register 18. Subsequently, with the resetting of the control unit 17 via the control line d, a new output cycle of the half bytes commences.

The half byte disposed in the half byte representation register 18 is converted via the digital-to-analog converter 19 (e.g. Analogic MP 8318) into an analog voltage signal and is transmitted to the monitor 10 as a video signal at the video input.

A synchronization generator 10, known per se and commercially available, can be discretely constructed from standard TTL-modules. It delivers the necessary synchronization signals (horizontal and vertical synchronization signals) for operating the monitor 10 as well as the basic clock pulse d and the 8-times higher clock pulse c.

Other modifications and changes may be suggested by those skilled in the art, however, it is the intention of the inventor to embody within the patent warranted hereon all changes and modifications as reasonably and properly come within the scope of his contribution to the art.

I claim as my invention:

1. An apparatus for checking record quality of a printing product to be formed from individual pixels, comprising:

a composition computer means for forming a bit map to be used in creating a printing product;

a memory means for storing the bit map;

computer means for receiving a plurality of successive lines during a read-out of the bit map and for forming successive groups, the groups being formed of a plurality of successive pixels in each of a plurality of successive lines, and said computer means calculating a gray value by averaging pixel values of each group;

video display means; and means for feeding the computed gray values together with positional information for each of the successive groups to the video display means for displaying on a monitor, whereby information contained in the original bit map is displayed with a number of picture elements which is substantially less than a number of pixels in the corresponding portion of the bit map.

2. An apparatus according to claim 1 wherein the computer means comprises a partial-byte computer.

3. An apparatus according to claim 1 wherein a partial-byte memory is provided connected to said computer means and which outputs to said video display means.

4. An apparatus according to claim 1 wherein the computer means comprises a half byte computer and which connects to a half byte memory in turn connected to the video display means.

5. An apparatus according to claim 1 wherein the video display means has a band width of at least $64 \times 10^6$ half-bytes/sec.

6. An apparatus according to claim 1 wherein said computer means comprises a partial byte computer and which connects to a partial byte memory, and wherein a selector means is provided between the partial byte memory and the video display means for selecting individual partial bytes from a packet of several partial bytes.

7. An apparatus according to claim 6 wherein the selector means is a 1 of 8 selector.

8. An apparatus according to claim 1 wherein between the computer means and video display means, a two-way RAM memory is provided which provides a multiple block interlating or nesting of the gray values associated with the successive groups.

9. An apparatus according to claim 8 wherein the RAM-two-way memory contains four interlaced or nested blocks.

* * * * *